US010065345B2

(12) United States Patent
Bartl et al.

(10) Patent No.: US 10,065,345 B2
(45) Date of Patent: Sep. 4, 2018

(54) METHOD FOR TRANSPORTING EXPANDED THERMOPLASTIC POLYMER PARTICLES

(71) Applicant: BASF SE, Ludwigshafen (DE)

(72) Inventors: Jürgen Bartl, Ludwigshafen (DE);
Christian Obermann, Speyer (DE);
Markus Buscher, Niederkirchen (DE);
Gerhard Weis, Queidersbach (DE);
Alexander Wolf, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/370,063

(22) Filed: Dec. 6, 2016

(65) Prior Publication Data

US 2017/0080615 A1 Mar. 23, 2017

Related U.S. Application Data

(62) Division of application No. 14/405,452, filed as application No. PCT/EP2013/061475 on Jun. 4, 2013, now Pat. No. 9,546,052.

(30) Foreign Application Priority Data

Jun. 6, 2012 (EP) .................................... 12170987

(51) Int. Cl.
| | | |
|---|---|---|
| B29C 44/42 | (2006.01) | |
| B29C 44/34 | (2006.01) | |
| B29C 31/04 | (2006.01) | |
| B65G 53/16 | (2006.01) | |
| B65G 53/52 | (2006.01) | |

(Continued)

(52) U.S. Cl.
CPC .............. *B29C 44/42* (2013.01); *B29B 13/00* (2013.01); *B29C 31/04* (2013.01); *B29C 31/041* (2013.01); *B29C 44/3442* (2013.01);

*B65G 53/16* (2013.01); *B65G 53/526* (2013.01); *C08J 9/00* (2013.01); *C08J 9/36* (2013.01); *B29K 2075/00* (2013.01); *B29K 2101/12* (2013.01); *B29K 2105/04* (2013.01); *B29K 2105/251* (2013.01); *B29L 2031/504* (2013.01); *B29L 2031/751* (2013.01); *C08J 2375/00* (2013.01); *C08J 2375/04* (2013.01)

(58) Field of Classification Search
CPC .......... B65G 53/16; B65G 53/526; C08J 9/36; C08J 9/0014; B29B 13/00; B29C 31/041; B29C 44/42; B29C 44/421
USPC ....................................... 406/47, 48, 95, 197
See application file for complete search history.

(56) References Cited

U.S. PATENT DOCUMENTS

| 3,344,212 A | 9/1967 | Francis |
|---|---|---|
| 3,782,791 A | 1/1974 | Neumann et al. |

(Continued)

OTHER PUBLICATIONS

International Search Report for PCT/EP2013/061475 dated Aug. 8, 2013.

*Primary Examiner* — Joseph A Dillon, Jr.
(74) *Attorney, Agent, or Firm* — Drinker Biddle & Reath LLP

(57) ABSTRACT

The invention relates to a method for transporting foamed thermoplastic polymer particles (3) from a container (5, 9) through at least one pipe (7,9), wherein, for transporting the foamed thermoplastic polymer particles (3), a gas stream is applied through the pipe (7, 11). The foamed thermoplastic polymer particles (3) are wetted with a water comprising lubricant.

13 Claims, 2 Drawing Sheets

Figure 1:
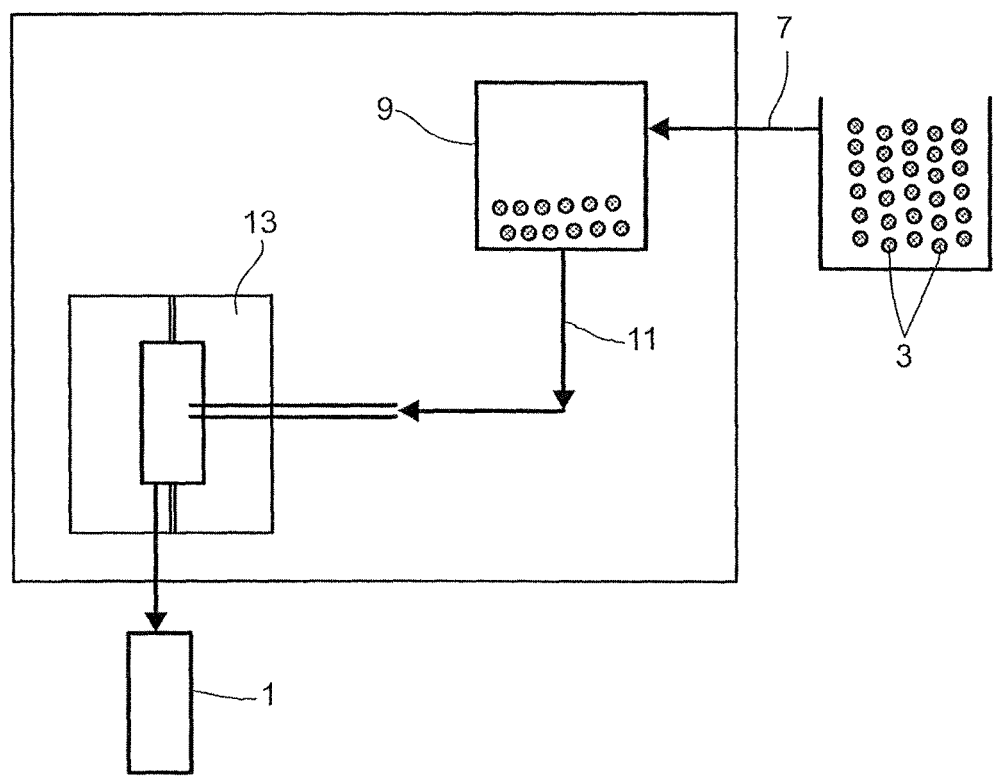

(51) Int. Cl.
  *C08J 9/00* (2006.01)
  *B29B 13/00* (2006.01)
  *C08J 9/36* (2006.01)
  *B29K 101/12* (2006.01)
  *B29K 105/04* (2006.01)
  *B29K 75/00* (2006.01)
  *B29K 105/00* (2006.01)
  *B29L 31/50* (2006.01)
  *B29L 31/00* (2006.01)

(56) References Cited

U.S. PATENT DOCUMENTS

| | | | |
|---|---|---|---|
| 3,885,631 A | 5/1975 | McBride | |
| 4,077,612 A | 3/1978 | Ricciardi | |
| 4,284,372 A | 8/1981 | Smith | |
| 4,783,292 A | 11/1988 | Rogers | |
| 4,882,225 A | 11/1989 | Fukui et al. | |
| 4,997,681 A | 3/1991 | Dockrill | |
| 5,000,624 A | 3/1991 | Steiger | |
| 5,080,534 A | 1/1992 | Goodson et al. | |
| 5,318,408 A | 6/1994 | Davidsson | |
| 5,356,577 A | 10/1994 | Boldis | |
| 5,558,473 A | 9/1996 | Lindahl | |
| 5,765,728 A | 6/1998 | Simpson et al. | |
| 5,993,117 A | 11/1999 | Lancaster | |
| 6,220,842 B1 | 4/2001 | Kamiyama et al. | |
| 6,582,161 B2 | 6/2003 | Noguki | |
| 7,435,369 B2 | 10/2008 | Hennis | |
| 8,596,931 B2 | 12/2013 | Nagashima | |
| 8,663,893 B2 | 3/2014 | Katano | |
| 2002/0114672 A1* | 8/2002 | Isozaki | B65G 53/66 406/11 |
| 2003/0155133 A1 | 8/2003 | Matsukawa et al. | |
| 2004/0115418 A1* | 6/2004 | Anderson | C08J 9/122 428/308.4 |
| 2010/0119312 A1 | 5/2010 | Nagashima | |
| 2012/0280419 A1 | 11/2012 | Martin et al. | |
| 2013/0274359 A1 | 10/2013 | Navez | |
| 2014/0252251 A1 | 9/2014 | Tunheim et al. | |
| 2014/0339321 A1 | 11/2014 | Ryokawa et al. | |
| 2016/0002427 A1* | 1/2016 | Pignagnoli | C08J 9/30 521/130 |

* cited by examiner

METHOD FOR TRANSPORTING EXPANDED THERMOPLASTIC POLYMER PARTICLES

CROSS-REFERENCE TO RELATED APPLICATIONS

This application is a divisional application of U.S. Ser. No 14/405,452, filed Dec. 4, 2014 which is a national stage application (under 35 U.S.C. § 371) of PCT/EP2013/061475, filed Jun. 4, 2013, which claims benefit of European Application No. 12170987.7, filed Jun. 6, 2012, all of which are incorporated herein by reference in their entirety.

The invention proceeds from a method for transporting foamed thermoplastic polymer particles from a container through at least one pipe, wherein, for transporting the foamed thermoplastic polymer particles, a gas stream is applied through the pipe.

There are many possible applications for foamed thermoplastic polymer particles. For instance, they can be used, for example, for manufacturing moldings, such as load carriers, seat cushions, mattresses, or else outer soles in shoes. For manufacturing the respective moldings, the foamed polymer particles are introduced into a tool and there, on the basis of the existing technology of molding machines currently in use, are charged with steam or heated, in such a manner that they fuse to one another on the outside thereof.

In order to introduce the foamed thermoplastic polymer particles into the tool, they are usually transported from a pressurized filling container through a pipe into the tool. For this purpose, it is firstly possible to apply an overpressure to the pressurized filling container and to transport the foamed thermoplastic polymer particles in this manner through the pipe into the tool. Alternatively, it is possible to apply a reduced pressure at the tool and draw the foamed thermoplastic polymer particles into the tool in this manner. Transport into the pressurized filling container is also carried out correspondingly.

However, it is disadvantageous with conventional methods that particles can stick to one another or can accumulate on walls, as a result of which, in particular, pipes become blocked. Also, using conventional lubricants which, for example, are added to the polymer mass as additive, a significant improvement cannot be achieved. The block effect owing to the adhesion to the surface, also caused by high elasticity of the particles and a resultant compressibility, leads on walls of the conduits to the fact that the pressurized filling containers can currently only be filled up to 50%, since blocks in the material supply conduits occur. Insufficiently filled tools result therefrom, firstly owing to the poor free-flowing ability, and secondly the poor free-flowingness of the foamed thermoplastic polymer particles. Processing is therefore only possible with considerable restrictions. A continuous processing process cannot be carried out and the share of rejected moldings owing to incompletely filled tools is comparatively high.

Therefore, it is an object of the present invention to provide a method for transporting foamed thermoplastic polymer particles, in which blocking of pipes is avoided.

The object is achieved by a method for transporting foamed thermoplastic polymer particles from a container through at least one pipe, wherein, for transporting the foamed thermoplastic polymer particles, a gas stream is applied through the pipe, wherein the foamed thermoplastic polymer particles are wetted with a water comprising lubricant.

Wetting the polymer particles with a water comprising lubricant avoids the individual foamed thermoplastic polymer particles sticking to one another during the transport and thus blocking the pipes through which the foamed thermoplastic polymer particles are to be transported. In addition, the result of this is that the tool during manufacture of the moldings is in each case completely filled and thus the fraction of reject parts can be reduced.

In order that, during transport through the pipe, the lubricating action does not diminish, it is, in addition, advantageous when such an amount of water comprising lubricant is added that the foamed thermoplastic polymer particles retain a moist surface and the lubricant does not evaporate on account of the gas stream which is used for conveying the foamed thermoplastic polymer particles.

The transport of the foamed thermoplastic polymer particles first proceeds from the manufacture of the particles into a storage container, wherein the storage container can also be a bag, sack or barrel, in which the foamed thermoplastic polymer particles are transported. From the storage container, the foamed thermoplastic polymer particles are usually conveyed by a further pipe into a pressurized filling container, and therefrom through a pipe into the tool.

A pipe, in the context of the present invention, is taken to mean both rigid and flexible pipes. Also a flexible tube, for example a polymer tube, comes according to the invention within the expression pipe.

The foamed thermoplastic polymer particles are manufactured according to customary methods. Thus, for example, it is possible to feed thermoplastic polymer granules to an extruder, to melt them in the extruder and add a blowing agent. The polymer mass is then forced through a tool and cut into individual grains. The granulation proceeds in this case preferably in a liquid which is held under pressure in order to prevent uncontrolled expansion of the particles. In a next step, the pressure is reduced in order to permit targeted expansion. For this purpose it is necessary that the polymer mass is not yet completely solidified. After the expansion, the polymer mass solidifies and the foamed thermoplastic polymer particles are obtained.

In order to avoid blocking by adhering particles or particles sticking to one another, it is necessary to wet the particles with the water comprising lubricant before corresponding adhesions can occur. For this purpose it is possible, for example, to add the water comprising lubricant in the container or in a transport pipe. If the water comprising lubricant is added in a transport pipe, it is advantageous, in particular, if the addition proceeds at the start of the transport pipe, in order that blocking does not occur on the section of the course between entry into the transport pipe and addition of the water comprising lubricant.

In order, in addition, also to avoid partial blocking occurring or only isolated particles adhering to one another which can lead to blocking, it is further advantageous if the water comprising lubricant is added uniformly distributed over the foamed thermoplastic polymer particles. For this purpose it is possible, for example, to spray the water comprising lubricant onto the foamed thermoplastic polymer particles. For spraying the water comprising lubricant, any desired suitable spray nozzle is suitable with which a liquid or a suspension can be sprayed.

In the case of an addition of the water comprising lubricant in the container, it is additionally advantageous if a plurality of spray nozzles are used, in such a manner that the water comprising lubricant is fed over the entire cross section of the container and in this manner all the polymer particles present in the container are wetted.

In order to obtain complete wetting of all foamed thermoplastic polymer particles in a container, it is further advantageous to provide the device for spraying the water comprising lubricant at a position in the container which is passed by all foamed thermoplastic polymer particles. It is particularly advantageous to provide the device for adding the water comprising lubricant in the upper region of the container and likewise to charge the particles from the top, in such a manner that the particles during charging are passed by the device for adding the water comprising lubricant and in this manner are wetted with the water comprising lubricant.

As an alternative to the use of spray nozzles for adding the water comprising lubricant it is also possible to design parts of the wall of a pipe or a container or the lid of the container as a double jacket and manufacture the wall facing into the interior of the pipe or container from a liquid permeable porous material and add the water comprising lubricant through the porous material.

In particular in the case of relatively long lengths of pipe through which the foamed thermoplastic polymer particles are conveyed, it is advantageous to add the water comprising lubricant at a plurality of positions that are in succession in the direction of flow. By adding the water comprising lubricant at a plurality of successive positions, the individual foamed thermoplastic polymer particles are wetted again if, for example, a part of the lubricant is evaporated owing to the gas stream necessary for the transport.

In a further embodiment, it is possible to use a moist gas stream for transporting the foamed thermoplastic polymer particles, wherein the moist gas stream is saturated with the water comprising lubricant. On account of the saturation of the gas stream with the water comprising lubricant, no further lubricant evaporates and the wetting of the polymer particles with the water comprising lubricant is retained. In this manner, during transport through relatively long pipes, clumping by sticking of individual polymer particles to one another or by sticking of polymer particles to the pipe wall can likewise be avoided.

The water comprising lubricants water without adding further substances are used. As an alternative it is also possible to use a mixture of water and silicone oils, glycerol esters and mixtures thereof as water comprising lubricant. Particular preference is given to the water comprising lubricant being water.

In an alternative embodiment, a solid lubricant is added to the water comprising lubricant. This is used in this case typically in powder form. Suitable pulverulent lubricants being added to the water comprising lubricant are, for example, selected from waxes, stearates, for example ethylenebisstearoyldiamine or talcum, or else mixtures of at least two of these components.

If a pulverulent lubricant is mixed to the water comprising lubricant it is preferred, to use a pulverulent lubricant which does not become sticky with the water comprising lubricant and thus further increases the danger of blocking.

If the water comprising lubricant is a mixture of water with further liquid or pulverulent substances, the amount of water is preferably in the range from 60 to 100 wt %, particularly in the range from 90 to 100 wt %, referring to the total mass of the lubricant.

The amount of water comprising lubricant which is added is dependent on the lubricant used and can be, on the basis of one liter of expanded thermoplastic polymer particles, in the range from 10 mg to 4 kg, preferably in the range from 1 g to 2 kg. If, as liquid lubricant, water without additionally admixed substances is used, the amount of water used is preferably in the range from 10 g to 4 kg, in particular in the range from 5 g to 3 kg, likewise in each case based on a volume of one liter of expanded thermoplastic polymer particles.

The thermoplastic polymer used for the foamed thermoplastic polymer particles can be any desired thermoplastic.

Particularly preferably, the foamed thermoplastic polymer is selected from expanded polypropylene (E-PP), expanded polyethylene (E-PE), expanded polystyrene (E-PS) and expanded thermoplastic polyurethane (E-TPU). Very particularly preferably, the foamed thermoplastic polymer is an expanded thermoplastic polyurethane.

The foamed thermoplastic polymer can comprise any desired fillers and additives which are used for processing thermoplastic polymers. Corresponding fillers and additives are known to those skilled in the art.

For instance, the foamed thermoplastic polymer can comprise, for example, lubricants, plasticizers, UV stabilizers, colorants, pigments and any desired other additives which are typically added to polymers. In addition, fillers or reinforcement substances, for example fibers, in particular short fibers, can be present.

In one embodiment, the foamed thermoplastic polymer comprises an interior or exterior lubricant. This is usually added as additive during the manufacture of the foamed thermoplastic polymer particles. The interior or exterior lubricant adheres to the surface of the individual foamed thermoplastic polymer particles and thus assists the lubricating effect, as a result of which clumping can be prevented. However, such an interior or exterior lubricant is not sufficient on its own, and so the water comprising lubricant is additionally added according to the invention.

The gas flow with which the foamed thermoplastic polymer particles are transported through the respective pipes can be generated, for example, by applying a superatmospheric pressure to the container and/or by applying a reduced pressure on the takeoff side of the powder. When a superatmospheric pressure is applied to the container, for example a fan is connected to the container and the gas flow is first passed through the container and then through the pipe, through which the foamed thermoplastic polymer particles are to be transported. Correspondingly, via a suitable vacuum pump on the takeoff side, a reduced pressure can be generated at the pipe, by which a gas stream is drawn through the pipe by suction, and so the thermoplastic polymer particles that are to be transported are drawn through the pipe by suction with the gas flow. A combination of applying a superatmospheric pressure on the side of the container and applying a reduced pressure on the takeoff side is also possible. However, it is preferred either to apply a superatmospheric pressure at the container or to apply a reduced pressure side on the takeoff side.

The gas with which the foamed thermoplastic polymer particles are transported through the pipe is a gas which is inert towards the thermoplastic polymer used. Particularly preferably, the gas with which the foamed thermoplastic polymer particles are transported through the pipe is air. In addition to air, however, for example nitrogen or steam are also suitable. Particular preference is given to the use of air for transporting the foamed thermoplastic polymer particles. The air used for transporting the foamed thermoplastic polymer particles preferably has a pressure in the range from 0 to 5 bar above atmospheric pressure.

The method according to the invention is suitable, as described above, for example for transporting the foamed thermoplastic polymer particles from a device for manufacturing the polymer particles into a storage container. The corresponding storage container can, for example, be a silo.

Alternatively, the storage container can also be a container for transporting the foamed thermoplastic polymer particles. A corresponding transport container is, for example, a transport bag, a transport sack, or else a barrel. If the polymer particles are temporarily stored in a silo, then, customarily, there next follows transport from the silo in a transport vehicle, for example a corresponding truck with a suitable container with which the foamed thermoplastic polymer particles can be transported. Charging the corresponding truck from the silo or else charging sacks or barrels from the silo likewise proceeds through pipes and so the method according to the invention can be used here also.

Typically, the foamed thermoplastic polymer particles are charged into a pressurized filling container in a next step. The charging of the pressurized filling container proceeds likewise generally through a pipe, for example from a storage container or else from a transport vehicle. The addition into the pressurized filling container proceeds preferably from the top. In the top region of the pressurized filling container, there is then situated a device with which the foamed thermoplastic polymer particles can be sprayed with the water comprising lubricant.

From the pressurized filling container, the foamed thermoplastic polymer particles are conveyed for further processing into a molding tool, likewise preferably via a pipe, for example a charging hose. In the molding tool the molding that is to be manufactured is then produced.

The pressure in the molding tool for manufacturing the molding is preferably in the range from 0 to 5 bar. In order to be able to convey the foamed thermoplastic polymer particles from the pressurized filling container into the molding tool, it is necessary that the pressure in the pressurized filling container is higher than the pressure in the molding tool. Preferably, the pressure in the pressurized filling container is up to 2 bar higher than the pressure in the molding tool. The molding tool is preferably charged via a pressurized filling method and crack splitting methods. These are known to those skilled in the art. In the molding tool, the thermoplastic polymer of the foamed thermoplastic polymer particles is fused by heating, in such a manner that the individual polymer particles weld to one another. Usually, for this purpose, superheated steam is introduced into the tool. In this manner, a dimensionally stable molding is manufactured from individual foamed thermoplastic polymer particles.

The individual foamed thermoplastic polymer particles generally have a median diameter in the range from 1 to 10 mm, in particular in the range from 1.5 to 6 mm. The bulk density of the foamed thermoplastic polymer particles is preferably in the range from 10 to 600 g/l, more preferably in the range from 20 to 500 g/l, and in particular in the range from 50 to 200 g/l.

The shape of the foamed thermoplastic polymer particles can be as desired, for example cylindrical or spherical or ellipsoidal. It is particularly preferred when the foamed thermoplastic polymer particles have a spherical shape.

Exemplary embodiments of the invention are shown in the figures and are described in more detail in the following description.

Figure 2:
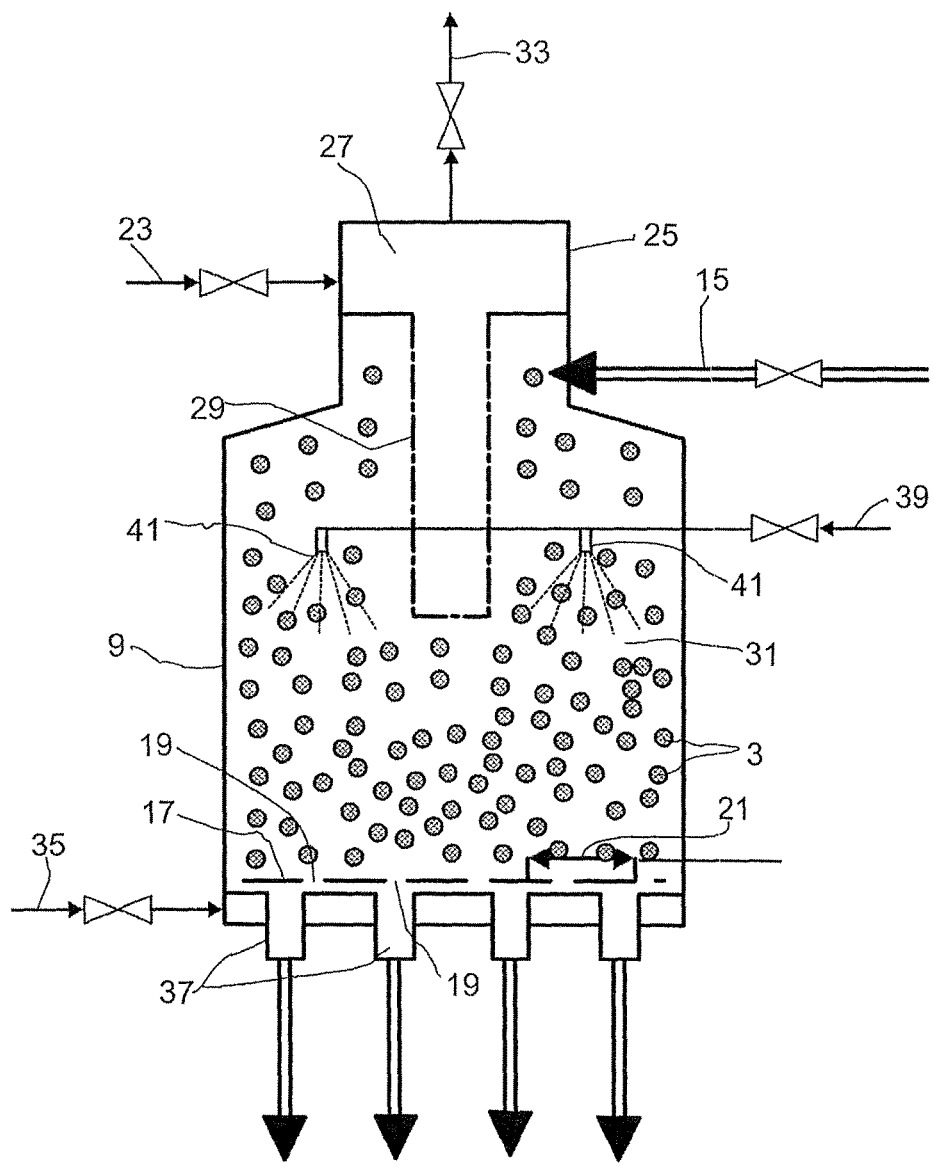

In the figures:
FIG. 1 shows a flow diagram of the method according to the invention for manufacturing moldings,
FIG. 2 shows a pressurized filling container for carrying out the method according to the invention.
FIG. 1 shows the method according to the invention in the form of a flow diagram for the manufacture of moldings.

For manufacturing moldings 1 from expanded thermoplastic polymer particles 3, first the expanded thermoplastic polymer particles 3 are transported from a container 5 through a pipe 7 into a pressurized filling container 9.

The container 5 is, for example, a storage container, a package, a sack, a barrel or else a silo or a transport container which can also be firmly connected to a transport vehicle. The expanded thermoplastic polymer particles 3 are usually likewise introduced into the container 5 through a pipe which is not shown here. Depending on the type of the container 5, it is also possible that the expanded thermoplastic polymer particles 3 are transferred into a further container which is likewise not shown here. For instance, the expanded thermoplastic polymer particles 3 can be transferred, for example, from a transport vehicle into a silo or else from a silo first into packages, barrels or sacks for further transport.

From the container 5, the expanded thermoplastic polymer particles 3 pass into the pressurized filling container 9. In the pressurized filling container 9, the thermoplastic polymer particles are kept at a substantially constant pressure. The use of the pressurized filling container 9 permits a continuous manufacturing process of the moldings 1, since, owing to the pressurized filling container 9, sufficient expanded thermoplastic polymer particles 3 are always held ready, which can be reshaped to give the molding 1. For manufacturing the molding 1, expanded thermoplastic polymer particles 3 are transported from the pressurized filling container 9 through a further pipe 11 into a molding tool 13. The transport in this case proceeds in a gas stream owing to a pressure difference between pressurized filling container 9 and molding tool 13. In this context it is firstly possible to apply a superatmospheric pressure at the pressurized filling container 9 or alternatively a reduced pressure at the molding tool 13. In the case of a superatmospheric pressure in the pressurized filling container 9, the expanded thermoplastic polymer particles 3 are forced into the molding tool 13, and in the case of a reduced pressure in the molding tool 13 are drawn into the molding tool 13 by suction. A combination of superatmospheric pressure in the pressurized filling container 9 and reduced pressure in the molding tool 9 is also possible. Owing to the pressure difference, a gas flow is generated in which the expanded thermoplastic polymer particles are entrained. Transport into the container 5 and from the container 5 into the pressurized filling container 9 also proceeds in the same manner. However, charging the pressurized filling container 9 and the container 5 does not generally proceed continuously. Thus, for example, it is usual, in each case when the level falls below a minimum filling level, or when material is delivered, to charge the container 5 or the pressurized filling container 9.

According to the invention, the expanded thermoplastic polymer particles are wetted with a water comprising lubricant in order to prevent clumping in containers 5, 9 and pipes 7, 11. The water comprising lubricant can be added for this purpose in the container 5, in the pressurized filling container 9, or in a pipe 7, 11. Addition at a plurality of positions is also possible. In order to obtain uniform wetting of the expanded thermoplastic polymer particles, it is advantageous to spray the expanded thermoplastic polymer particles 3 with the water comprising lubricant. For spraying, here, any desired spray nozzle known to those skilled in the art and suitable for the water comprising lubricant can be used. Those which are particularly suitable are Lechler nozzles. Further suitable nozzles are, for example, flat spray nozzles, hollow nozzles and full cone nozzles, and also simple boreholes and slots. Thus, for example, it is possible to provide boreholes as nozzles in a ring pipe in the container 5, 9, or in the pipe 7, 11, wherein the ring pipe is preferably orientated transverse to the direction of flow for wetting as complete as possible. Besides the use of nozzles it is also possible to design parts of the wall of a pipe 7, 11 or of the container 5, 9 or the lid of the container as a double jacket and manufacture the wall facing into the interior of the pipe or container from a liquid permeable porous material and add the water comprising lubricant through the porous material.

FIG. 2 shows by way of example a pressurized filling container having a device for wetting the expanded thermoplastic polymer particles.

Via a charging line 15, expanded thermoplastic polymer particles 3 are introduced into the pressurized filling container 9. The charging line 15 is situated here preferably in the upper region of the pressurized filling container 9. The expanded thermoplastic polymer particles 3 fall onto a base 17 in the pressurized filling container. The base 17 has openings 19 through which the expanded thermoplastic polymer particles can be withdrawn. Using a pusher 21, the expanded thermoplastic polymer particles 3 can be pushed to the respective openings 19 on the base, in order to permit complete emptying of the pressurized filling container 9.

In order to maintain the necessary pressure in the pressurized filling container 9, a gas, preferably air or nitrogen, can be introduced via a filling-pressure line 23 into the pressurized filling container 9. The filling-pressure line 23 is situated here, preferably, at the top 25 of the pressurized filling container 9 and opens out into a gas space 27 which is separated by a filter unit 29 from the material region 31 of the pressurized filling container 9. In addition, a venting line 33 opens out into the gas space 27, through which venting line the pressurized filling container can be vented and brought to ambient pressure, for example for an overhaul.

For withdrawal of the expanded thermoplastic polymer particles, a transport gas is introduced into the pressurized filling container 9 via a transport gas line 35. The transport gas line 35 here opens out preferably below the base 17. The transport gas is then introduced together with expanded thermoplastic polymer particles through a takeoff opening 37 into the pipe 11, which is not shown here, and conducted to the molding tool 13.

According to the invention, the expanded thermoplastic polymer particles are wetted with a water comprising lubricant. For this, the water comprising lubricant, for example water, is passed through a lubricant line 39 to spray nozzles 41 in the material region 31 of the pressurized filling container 9. Through the spray nozzles, the water comprising lubricant is distributed onto the expanded thermoplastic polymer particles in such a manner that the expanded thermoplastic polymer particles are substantially completely wetted with the water comprising lubricant.

In addition to the arrangement of the spray nozzles 41 in the pressurized filling container, alternatively, or in addition, spray nozzles can also be provided in the container 5, in further containers, or else in pipes.

EXAMPLES

Comparative Example

In the manufacture of a molding made of particles of E-TPU 32 mg on a molding machine, a pressurized filling container (9) having a capacity of 60 l was charged as usual. In the start phase, in the pressurized filling container (9) and during the cycle in the filling operation of a molding tool (13) for a slab having the dimensions 300 mm×200 mm×25mm, blocking of the E-TPU particles occurred in the filling hoses (11) from the pressurized filling container (9) to the molding tool (13), both of the particles among one another and also at the walls of the filling hoses (11). Owing to these blocking incidents, no material was introduced into the molding tool (13) via the fillers situated in the molding tool (13), although a constant air stream was available for transporting the particles. Only partial filling of the molding tool (13) could be achieved. Also, during the blast, usually lasting between 2 and 10 s, for blowing the particles not required for filling the molding out of the filling hoses (11) into the pressurized filling container (9), blocking occurred in the transition region of the filling hoses (11) into the pressurized filling container (9). Continuous manufacture of moldings could not be ensured for this reason. In the manufacture of the slabs using this discontinuous procedure, on filling the pressurized filling container to less than 50%, a reject rate of markedly more than 60% occurred owing to the frequently occurring partial filling of the tool. A further filled pressurized filling container (9) led to a still higher reject rate.

Example

Under the same conditions as in the comparative example, a molding of E-TPU 32 mg was manufactured using a molding machine. For this purpose, the pressurized filling container (9) was filled as usual. In contrast to the comparative example, however, during the filling phase of the pressurized filling container (9), the particles in the pressurized filling container (9) were charged with water at a rate of 2.5 kg/l of particles. When the mold filling operation is initiated, immediately before the mold filling operation, in each cycle, approximately 0.6 l of water was sprayed into the pressurized filling container (9) in order to ensure here continuous moistening of the particles during the entire process. Using this procedure, even from the second cycle, good, filled moldings were able to be manufactured in continuous operation. No blocking of the particles in the pressurized filling container (9) and in the filling hoses (11) was observed during the mold filling operation and during the backblast of the excess particles into the pressurized filling container (9). An interruption no longer occurred during the entire manufacture of the moldings. The reject rate was less than 5%.

LIST OF REFERENCE SIGNS

1 Molding
3 Expanded thermoplastic polymer particles
5 Container
7 Pipe
9 Pressurized filling container
11 Pipe
13 Molding tool
15 Charging line
17 Base
19 Opening
21 Pusher
23 Filling-pressure line
25 Top
27 Gas space
29 Filter unit
31 Material region
33 Venting line
35 Transport gas line 37 Takeoff opening
39 Lubricant line
41 Spray nozzle

We claim:

1. A method for transporting foamed thermoplastic polymer particles from a container
through at least one pipe to a molding tool in which a molding is manufactured from individual foamed thermoplastic polymer particles, comprising
   (a) wetting the foamed thermoplastic polymer particles with a water comprising lubricant, and
   (b) transporting the foamed thermoplastic polymer particles by applying a gas stream through the pipe to the molding tool, wherein the water comprising lubricant is added in such an amount that the foamed thermoplastic polymer particles retain a moist surface and that the lubricant does not evaporate on account of the gas stream which is used for conveying the foamed thermoplastic polymer particles.

2. The method according to claim 1, further comprising adding the water comprising lubricant in the container or in the pipe.

3. The method according to claim 1, wherein the foamed thermoplastic polymer particles are wetted by spraying the water comprising lubricant onto the foamed thermoplastic polymer particles.

4. A method for transporting foamed thermoplastic polymer particles from a container through at least one pipe to a molding tool, comprising
   (a) wetting the foamed thermoplastic polymer particles with a water comprising lubricant, and
   (b) transporting the foamed thermoplastic polymer particles by applying a gas stream through the pipe to the molding tool, and
   wherein the foamed thermoplastic polymer particles are wetted by adding water comprising lubricant at a plurality of positions that are in succession in the direction of flow.

5. The method according to claim 1, wherein the amount of water in the water comprising lubricant is in the range from 60 to 100% by weight.

6. The method according to claim 5, wherein the water comprising lubricant additionally comprises a silicone oil, a glycerol ester or mixtures thereof.

7. The method according to claim 5, wherein the water comprising lubricant additionally comprises a pulverulent lubricant which is selected from waxes, stearates, talcum and mixtures of at least two of these components.

8. The method according to claim 1, wherein the amount of water comprising lubricant which is added is in the range from 10 mg to 4 kg, in each case based on one liter of expanded thermoplastic polymer particles.

9. The method according to claim 1, wherein the foamed thermoplastic polymer is selected from the group consisting of expanded polypropylene, expanded polyethylene, expanded polystyrene and expanded thermoplastic polyurethane.

10. The method according to claim 1, wherein the foamed thermoplastic polymer comprises an interior or exterior lubricant.

11. The method according to claim 1, wherein the gas flow is generated by applying a superatmospheric pressure at the container and/or a reduced pressure on the takeoff side of the pipe, or both.

12. The method according to claim 1, wherein the container is a filling-pressure container.

13. The method according to claim 1, wherein the foamed thermoplastic polymer particles are transported by applying a gas stream through a pipe from a container to a filling-pressure container and by applying a gas stream through a pipe from the filling-pressure container to the molding tool.

* * * * *